United States Patent [19]

Ackroyd

[11] Patent Number: 5,052,655
[45] Date of Patent: Oct. 1, 1991

[54] BALL VALVE LOCK PLATE

[75] Inventor: Rand H. Ackroyd, Methuen, Mass.

[73] Assignee: Watts Regulator Company, Lawrence, Mass.

[21] Appl. No.: 554,693

[22] Filed: Jul. 18, 1990

[51] Int. Cl.$^5$ .................... F16K 35/02; F16K 5/10; G01M 19/00
[52] U.S. Cl. .................... 251/95; 70/175; 70/179; 70/180; 70/212; 137/271; 137/385; 251/113; 251/116; 251/206; 251/208
[58] Field of Search ............... 137/559, 269, 270, 271, 137/385; 251/89, 90, 95, 98, 99, 102, 103, 104, 107, 108, 109, 114, 115, 116, 207, 208, 315; 70/175, 177, 179, 180, 210, 211, 212

[56] References Cited

U.S. PATENT DOCUMENTS

| | | | |
|---|---|---|---|
| 508,365 | 11/1893 | Bothwell | 251/109 |
| 1,380,307 | 5/1921 | Capewell | 251/107 |
| 2,820,676 | 1/1958 | Cleaves | 251/109 |
| 3,648,970 | 3/1972 | Hartmann et al. | 251/104 |
| 4,208,033 | 6/1980 | Kesterman | 251/95 |
| 4,741,361 | 5/1988 | McHugh | 137/559 |
| 4,852,610 | 8/1989 | McHugh | 137/385 |
| 4,890,814 | 1/1990 | Thomas | 251/95 |

*Primary Examiner*—George L. Walton
*Attorney, Agent, or Firm*—Fish & Richardson

[57] ABSTRACT

There is described a lock plate assembly for use with a three-position ball valve. The valve has a body, a valve element disposed for rotation within the body, and a handle mounted for rotation upon the body for operation of (off) position, a second (test) position and a third (drain) position. The lock plate assembly includes a lock plate frame defining a first frame stop for the handle in the first position and a second frame stop for the handle in the third position, a slide latch defining a latch stop for the handle in the second position, the latch stop being mounted upon the frame for movement between a first latch position with the latch stop disposed to prevent movement of the handle to the third position, and a second latch position with the latch stop removed from the path of the handle, and a spring or the like for biasing the slide latch toward the first latch position.

6 Claims, 3 Drawing Sheets

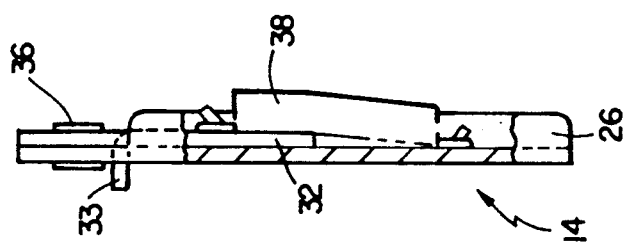
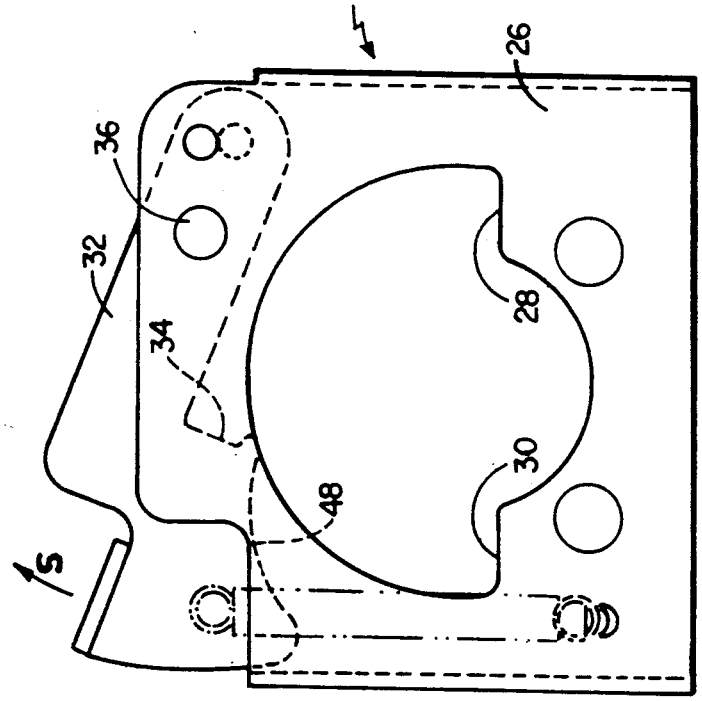
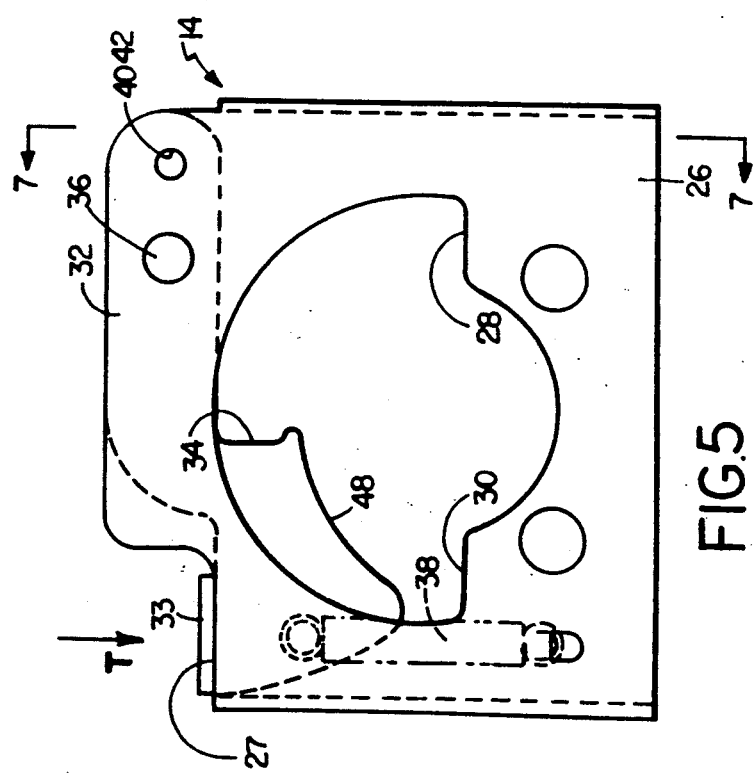
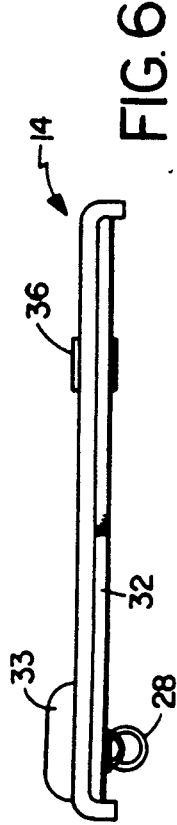

BALL VALVE LOCK PLATE

BACKGROUND OF THE INVENTION

The invention relates to a locking device for three-position ball valves, e.g. of the type for use in testing and draining fire suppression water sprinkler systems.

Fire suppression systems typically consist of a multiplicity of sprinklers disposed about a building or a region of a building. The sprinklers are connected to an arrangement of piping extending from a source of water under pressure. In the usual system, the sprinklers are closed by a fusible link or bulb engineered to release in the presence of a predetermined temperature to allow water to flow from the sprinkler to suppress a fire. Typically, the piping arrangement terminates at a test valve, and means are provided, usually at an initial point in fire suppression piping where it is connected to the external source of water, to detect flow of water into the system, indicating that at least one sprinkler has been actuated, e.g. by the presence of a fire, and also to trigger an external alarm, e.g. by actuation of a water motor or the like.

For insurance purposes, each fire suppression system must be tested periodically, both to ensure that the piping system is under pressure and that the external alarm is operational. For the purpose of repair, it is also, at times, necessary to drain the piping system.

It has been suggested, e.g. as described in McHugh U.S. Pat. No. 4,741,361, the disclosure of which is incorporated herein by reference, to include both functions in a single three-position ball valve disposed at the piping system termination. The ball valve in a first (off) position secures the piping system under pressure. A second (drain) position allows a limited, predetermined flow of water through the valve to simulate actuation of a single sprinkler head, in order to test the function of the external alarm. In a third (drain) position, the valve is more fully opened to allow the piping system to drain (after the external source is shut-off), e.g. for repair to the system.

SUMMARY OF THE INVENTION

According to a first aspect of the invention, there is described a lock plate assembly for use with a three-position ball valve. The valve has a body, a valve element disposed for rotation within the body, and a handle mounted for rotation upon the body for operation of the valve element, the handle being movable among a first (off) position, a second (test) position and a third (drain) position. The lock plate assembly comprises a lock plate frame defining a first frame stop for the handle in the first position and a second frame stop for the handle in the third position, a slide latch defining a latch stop for the handle in the second position, the latch stop being mounted upon the frame for movement between a first latch position with the latch stop disposed to prevent movement of the handle to the third position, and a second latch position with the latch stop removed from the path of the handle, and means for biasing the slide latch toward the first latch position.

According to a second aspect of the invention, the three-position ball valve and the lock plate assembly are described in combination.

Preferred embodiments of both aspects of the invention may include one or more of the following features. The means for biasing comprises a spring mounted between the lock plate frame and the slide latch. The lock plate assembly further comprises means for limiting movement of the slide latch toward the second latch position.

Thus there is provided a lock plate assembly for securing a three-position ball valve from tampering and unauthorized operation that could result in an associated fire suppression system being rendered inoperative.

These and other features and advantages of the invention will be apparent from the following description of a presently preferred embodiment, and from the claims.

DESCRIPTION OF A PRESENTLY PREFERRED EMBODIMENT

We first briefly describe the drawings.

FIG. 1 is perspective view of a three-position ball valve equipped with a lock plate assembly of the invention, while

FIG. 2 is a somewhat diagrammatic plan view of the valve handle and lock plate assembly with the handle in first (off) position, while

FIG. 3 is a similar view of the valve handle and lock plate assembly with the handle in second (test) position, while

FIG. 4 is a similar view of the valve handle and lock plate assembly with the handle in third (drain) position, while

Figure 1:
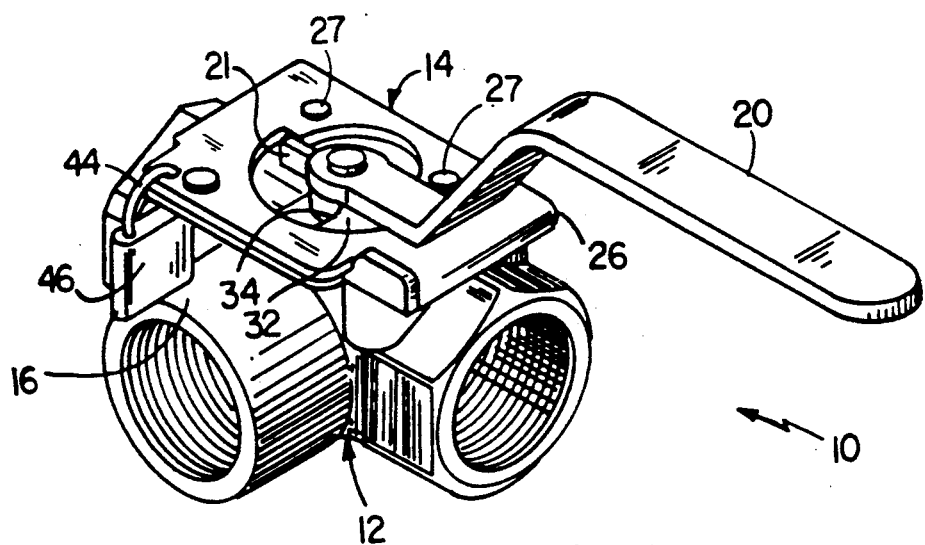

FIG. 5 is a plan view of the lock plate assembly of FIG. 1 with the slide latch in first latch position, while FIG. 5A is a similar view with the slide latch in second latch position; and FIGS. 6 and 7 are side and side section views of the lock plate assembly taken respectively at lines 6—6 and 7—7 of FIG. 5.

Referring to FIG. 1, a three-position ball valve and lock plate assembly 10 includes a ball valve 12 and a lock plate assembly 14 of the invention.

Figure 1A:
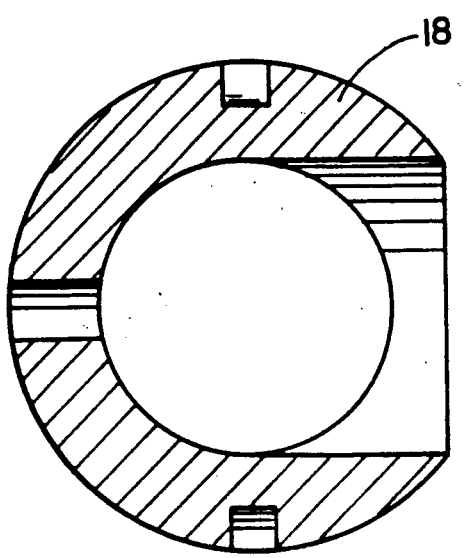
FIG. 1A is a sectional view of a typical ball element for the valve of FIG. 1.
Figure 4:
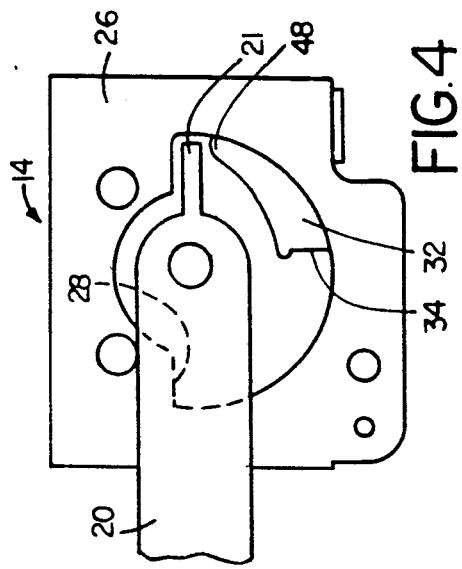
Figure 4A:
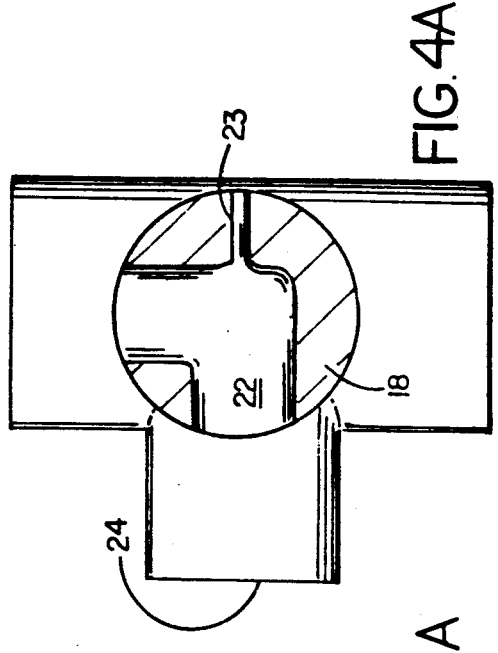
FIG. 4A is a similar view of the valve element.
Figure 2:
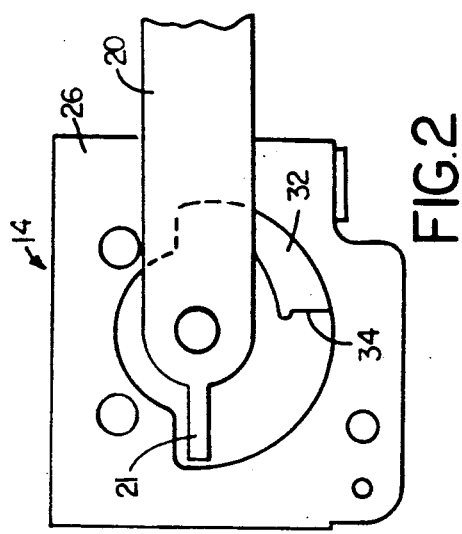
Figure 2A:
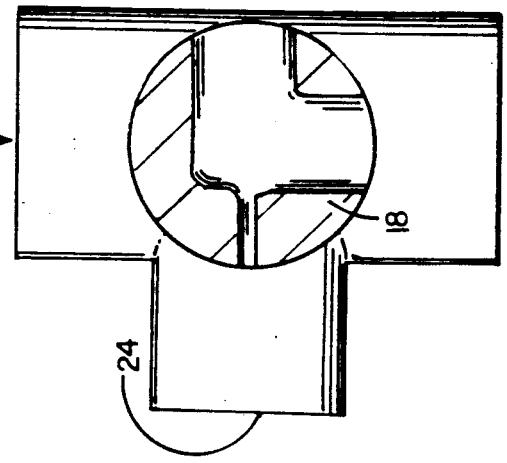
FIG. 2A is a similar view of the valve element.

The ball valve 12 is of standard construction, e.g. a Model 1000 Three-Position Ball Valve as supplied by Watts Regulator Company of North Andover, Massachusetts, having a body 16, a valve element 18 (FIG. 1A) disposed within the body, and a handle 20 mounted for rotation upon the body for operation of the ball valve element. The handle 20 is movable between a first (off) position (FIG. 2) in which valve element 18 is disposed to prevent flow (arrow W) through the valve (FIG. 2A), a second (test) position (FIG. 3) in which the valve element 18 is disposed to allow fluid to flow through the valve via a test orifice 23 of predetermined size, ⅛ inch diameter (FIG. 3A), and a third (drain) position (FIG. 4) in which the valve element 18 is disposed to allow fluid to flow through the valve via a larger flow orifice 22 in order to allow flow W to drain through the line 24 (FIG. 4A).

The lock plate assembly 14 consists of a lock plate frame 26 mounted on the ball valve 12 by means of fasteners 27 and defining a first frame stop 28 for the handle 20 in the first (off) position (FIG. 2) and a second frame stop 30 for the handle in the third (drain) position (FIG. 4), and a slide latch 32. The slide latch, which defines a latch stop 34 for the handle in the second (test) position, is pivotally mounted upon the frame 26 by means of rivet 36 for movement between a first latch position (FIG. 5) with the latch stop 34 disposed to prevent movement of the handle 20 to the third (drain) position and a second latch position (FIG. 5A) with the latch stop 34 removed from the path of the handle. A tension spring 38 extending between the frame 26 and the latch 32 biases the latch toward the first position. An upstanding lip 33 of the latch 32 is disposed to engage the edge 27 of the frame 26 to limit movement of the slide latch toward the first position. Aligned holes 40, 42 in the frame 26 and slide latch 32 are sized to receive the hasp 44 of a padlock 46 (FIG. 1) or other lock-out device for securing the lock plate assembly and valve against tampering and unauthorized movement of the valve to the drain position.

The lock valve assembly 14 may be installed on an existing three-position ball valve 12, or a ball valve and lock plate assembly combination 10 may be installed, e.g., in a fire sprinkler test line.

Figure 3:
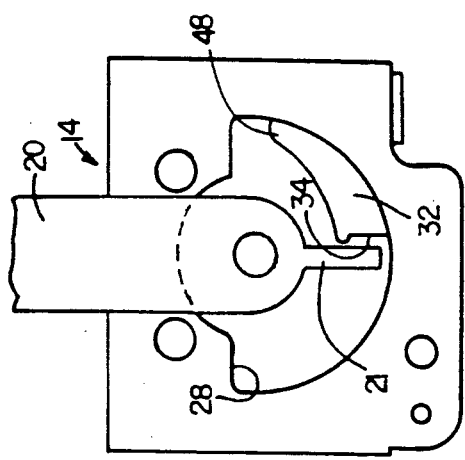
Figure 3A:
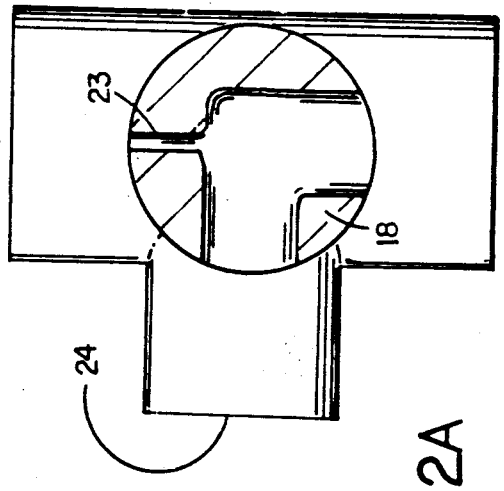
FIG. 3A is a similar view of the valve element.

The valve 12 is normally positioned with the valve element 18 and handle 20 in the first (off) position (FIGS. 2 and 2A), with the downpending handle element 21 bearing on the first frame stop 28. For testing purposes, the handle 20 is rotated until the element 21 bears upon the latch stop 34, indicating that the valve element 18 is in the second (test) position (FIGS. 3 and 3A). Rotation of the handle 20 and valve element 18 to the third (drain) position is prevented by positioning of the slide latch 32 in its first position (FIG. 5), with the hasp 44 of the padlock 46 securing the slide latch against tampering.

To move the valve element 18 to third (drain) position (FIGS. 4 and 4A), the padlock is removed, and the slide latch 32 pivoted outwardly (arrow S, FIG. 5A) by pushing lip 33 to remove the latch stop 34 and allow the handle 20 to be rotated until the handle element 21 comes into engagement with the second frame stop 30.

To return the valve element 18 to the second or first positions, the handle 20 is simply rotated, the tapering surface 48 of the slide latch allowing the handle to turn as the downpending handle element 21 gradually urges the slide latch 32 outwardly (arrow S) against the bias of the spring 38. When the handle element 21 passes the second position, the slide latch 32 is drawn inwardly (arrow T, FIG. 5) by the spring to the first latch position, thus preventing accidental return of the valve element 18 to the third (drain) position without release of the slide latch 32.

Other embodiments are within the following claims.

What is claimed is:

1. For use with a three-position ball valve, said valve having a body, a valve element disposed for rotation within said body, and a handle mounted for rotation upon said body for operation of said valve element, said handle being movable among a first (off) position, a second (test) position and a third (drain) position, a lock plate assembly comprising:

a lock plate frame defining a first frame stop for said handle in said first position, a slide latch defining a latch stop for said handle in said second position, said slide latch being mounted upon said frame for movement between a first latch position with said latch stop disposed in the path of said handle in a manner to prevent movement of said handle from said second position toward said third position, and a second latch position with said latch stop removed from the path of said handle to permit movement of said handle from said second position to said third position, said handle, when moving from said third position toward said second position, adapted to urge said latch stop toward said second latch position to permit said handle to move from said third position toward said second position, said latch stop in said first latch position and in said second latch position being adapted to permit movement of said handle from said third position toward said second position, said lock plate frame further defining a second frame stop for said handle in said third position, said first frame stop being adapted to prevent movement of said handle beyond said first position and said second frame stop being adapted to prevent movement of said handle beyond said third position, and means for biasing said slide latch toward said first latch position.

2. The lock plate assembly of claim 1 wherein said means for biasing comprises a spring mounted between said lock plate frame and said slide latch.

3. The lock plate assembly of claim 1 further comprising means for limiting movement of said slide latch toward said second latch position.

4. A three-position ball valve assembly comprising a ball valve and a lock plate assembly, said ball valve comprising a body, a valve element disposed for rotation within said body, and a handle mounted for rotation upon said body for operation of said valve element, said handle being movable among a first (off) position, a second (test) position and a third (drain) position, and said lock plate assembly comprising a lock plate frame defining a first frame stop for said handle in said first position, a slide latch defining a latch stop for said handle in said second position, said slide latch being mounted upon said frame for movement between a first latch position with said latch stop disposed in the path of the handle in a manner to prevent movement of said handle from said second position toward said third position, and a second latch position with said latch stop removed from the path of said handle to permit movement of said handle from said second position to said third position, said handle, when moving from said third position toward said second position, adapted to urge said latch stop toward said second latch position to permit said handle to move from said third position toward said second position, said latch stop in said first latch position and in said second latch position being adapted to permit movement of said handle from said third position toward said second position, said lock plate frame further defining a second frame stop for said handle in said third position, said first frame stop being adapted to prevent movement of said handle beyond said first position and said second frame stop being adapted to prevent movement of said handle beyond said third position, and means for biasing said slide latch toward said first latch position.

5. The ball valve assembly of claim 4 wherein said means for biasing said slide latch comprises a spring mounted between said lock plate frame and said slide latch.

6. The ball valve assembly of claim 4 further comprising means for limiting movement of said slide latch toward said second latch position.

* * * * *